Figure 1:
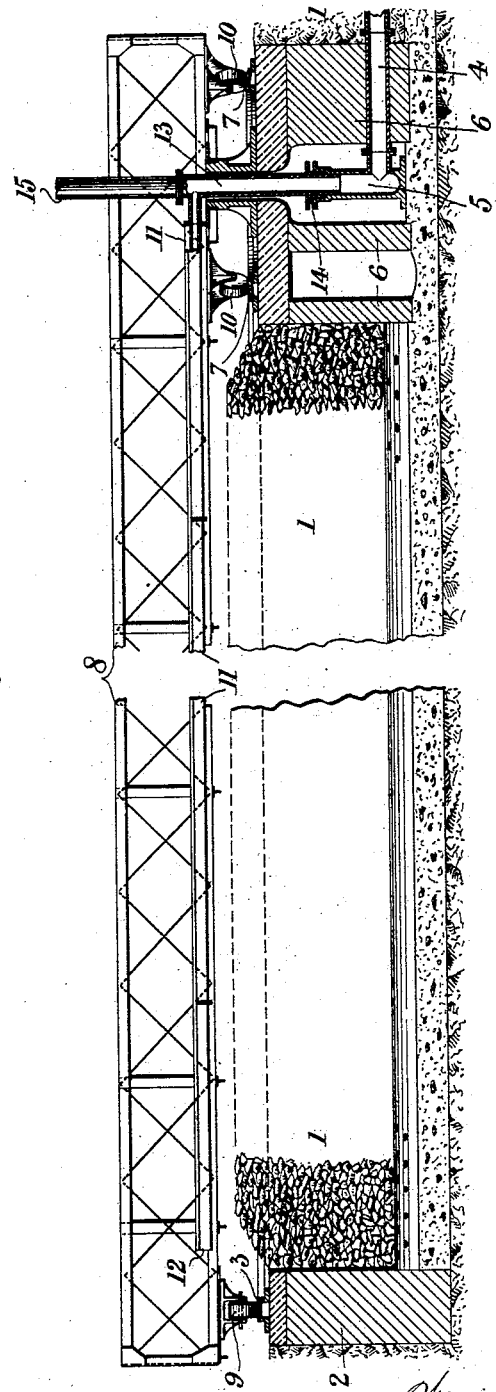

No. 710,525. Patented Oct. 7, 1902.
W. D. SCOTT-MONCRIEFF.
APPARATUS FOR DISTRIBUTING LIQUIDS OVER FILTER BEDS.
(Application filed Aug. 9, 1901.)
(No Model.) 4 Sheets—Sheet 1.

Witnesses:
Thomas F. Wallace
George Williams.

Inventor:-
William Dundas Scott-Moncrieff
By his Attorneys
Arthur C. Fraser &Co

No. 710,525. Patented Oct. 7, 1902.
W. D. SCOTT-MONCRIEFF.
APPARATUS FOR DISTRIBUTING LIQUIDS OVER FILTER BEDS.
(Application filed Aug. 9, 1901.)
(No Model.) 4 Sheets—Sheet 2.
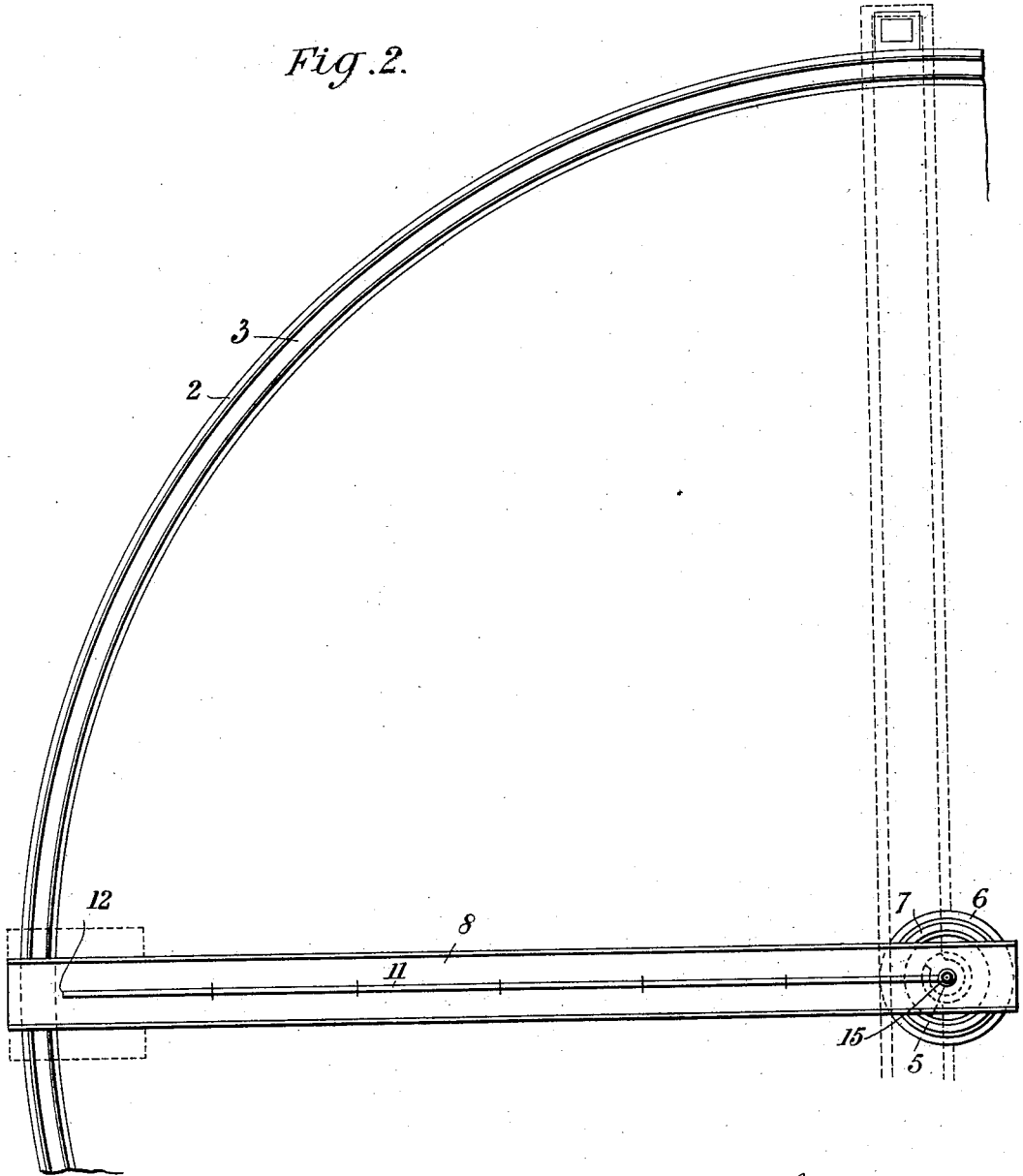

No. 710,525. Patented Oct. 7, 1902.
W. D. SCOTT-MONCRIEFF.
APPARATUS FOR DISTRIBUTING LIQUIDS OVER FILTER BEDS.
(Application filed Aug. 9, 1901.)
(No Model.) 4 Sheets—Sheet 3.
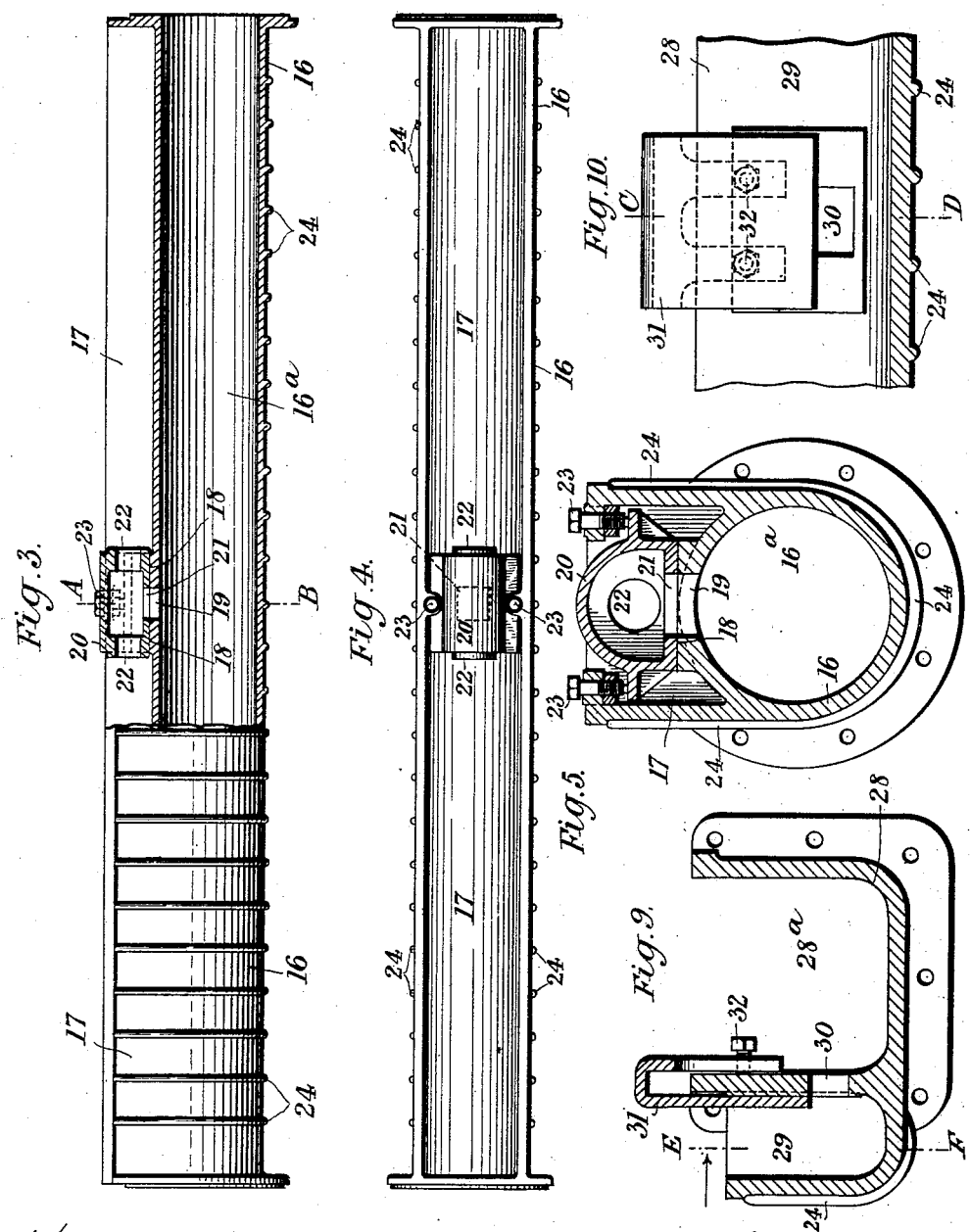

No. 710,525. Patented Oct. 7, 1902.
W. D. SCOTT-MONCRIEFF.
APPARATUS FOR DISTRIBUTING LIQUIDS OVER FILTER BEDS.
(Application filed Aug. 9, 1901.)
(No Model.) 4 Sheets—Sheet 4.
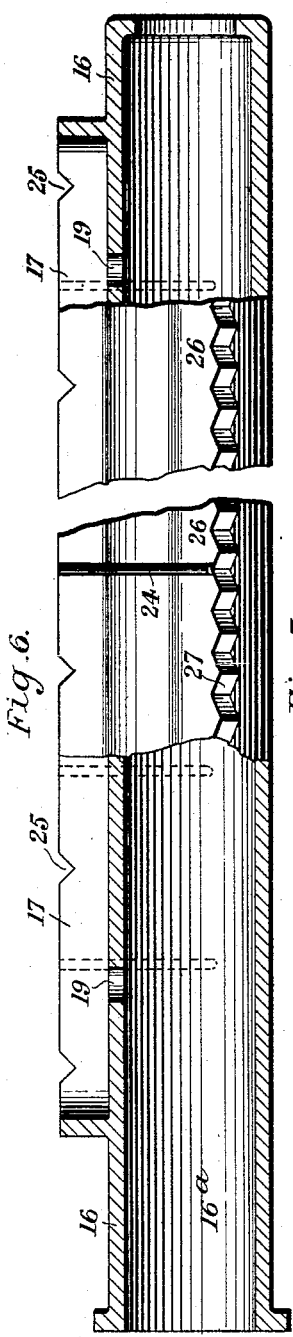
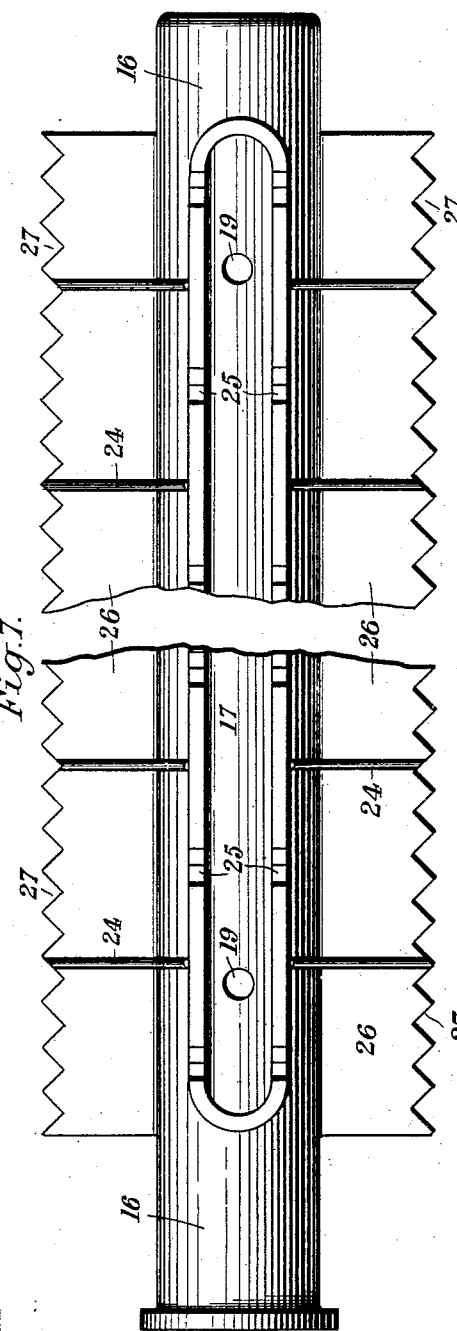
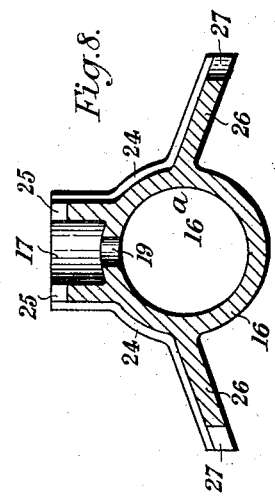

UNITED STATES PATENT OFFICE.

WILLIAM DUNDAS SCOTT-MONCRIEFF, OF WESTMINSTER, ENGLAND.

APPARATUS FOR DISTRIBUTING LIQUIDS OVER FILTER-BEDS.

SPECIFICATION forming part of Letters Patent No. 710,525, dated October 7, 1902.

Application filed August 9, 1901. Serial No. 71,470. (No model.)

*To all whom it may concern:*

Be it known that I, WILLIAM DUNDAS SCOTT-MONCRIEFF, engineer, Fellow of the Sanitary Institute, a subject of the King of Great Britain and Ireland, residing at 14 Victoria street, Westminster, London, England, have invented certain new and useful Improvements in Apparatus for Distributing Liquids Over Filter-Beds, of which the following is a specification.

This invention relates to improved apparatus for distributing liquids over filter-beds for the bacterial purification of sewage.

My improved apparatus comprises one or more horizontal distributing ducts or pipes, which may either be fixed or arranged to travel over the bed to be treated. In the case of large beds I employ a horizontal distributing duct or pipe revolving around a vertical axis constituted by a vertical pipe working in a gland and stuffing-box, through which the incoming liquid is delivered to the revolving pipe through a right-angled vertical pipe connection. The revolving distributing duct or pipe is constructed in lengths or sections with a continuous channel or bore which is closed at its outer end, and each section is cast or otherwise provided with a trough that communicates with the channel of the duct or the bore of the pipe by means of a suitable opening or openings formed in the thickness of the duct or pipe at a suitable point or points. In operation when the distributing duct or pipe is charged with liquid the said liquid flows through the aforesaid openings into the troughs and after filling them flows over their edges. For the purpose of regulating the welling up of the liquid into the troughs I may employ any suitable simple form of adjustable regulator. Along the sides of the distributing duct or pipe I provide in the case of stationary distributers continuous projecting webs with serrated edges or flanges, which cause the liquid overflowing the edges of the troughs to assume the form of thin uniform sheets, which drip upon reaching the serrated edges. In the case of distributers arranged to travel over the surface of the bacterial beds I do away with the projecting serrated flanges; but in both cases I construct the distributing duct or pipe and troughs with external annular ribs at intervals, so that the down-flowing liquid is prevented from dripping irregularly by traveling longitudinally and giving rise to an uneven overflow.

In a practical arrangement of my improved apparatus the distributing duct or pipe with its troughs is carried on a beam or girder, so that the whole apparatus can be revolved around the aforesaid vertical axis as a center by means of any convenient form of motive machinery or by animal-power. Any desired number of such ducts or pipes may be employed to distribute liquid over one and the same filter-bed.

Referring to the accompanying drawings, Figures 1 to 5, inclusive, show one modification of my improved apparatus comprising a traveling distributing-duct in the form of a horizontal pipe arranged to revolve and distribute over a circular filter-bed, Fig. 1 being a side elevation, partly in section, and Fig. 2 being a diagrammatic plan. Figs. 3 and 4 are respectively a side elevation, partly in central vertical longitudinal section and a plan of part of the distributing-pipe, showing a complete section thereof; and Fig. 5 is a vertical cross-section on the line A B of Fig. 3. Figs. 3 and 4 are drawn to a larger scale than Figs. 1 and 2, and Fig. 5 is drawn to a considerably larger scale than Figs. 3 and 4. Figs. 6, 7, and 8 show a section or length of a stationary distributing-pipe, Fig. 6 being a side elevation, partly in section, Fig. 7 a plan, and Fig. 8 a central cross-section of Fig. 6. These figures are approximately on the same scale as Figs. 3 and 4. Figs. 9 and 10 illustrate part of a section or length of an open-topped duct, Fig. 9 being a vertical cross-section on the line C D of Fig. 10, and Fig. 10 being a vertical section on the line E F of Fig. 9. These figures are on the same scale as Fig. 5.

In all the figures similar parts are indicated by the same reference-numerals.

Referring first to Figs. 1 and 2, 1 is the filter-bed, over which liquid, such as sewage, is to be distributed evenly, bounded by a circular wall or the like 2, on which is a corresponding circular rail or track 3. The liquid to be distributed is supplied through a pipe 4, having a vertical extension in the form of a pipe 5, situated in the central cavity of a masonry pier 6, on the top of which is a circular rail or track 7, struck from the vertical axis of the vertical pipe 5 as a center. The track 3 is also struck from this center. 8 is a girder somewhat longer than the radius of the bed 1. It is supported at its outer end by wheels 9, running on the rail 3, and at its inner end by wheels 10, running on the rail 7. The arrangement is such that when the girder 8 is moved at its outer end by animal or mechanical power along the track 3 the girder will pivot as a whole on the vertical axis of the pipe 5 as a center and will sweep progressively over the entire area of the filter-bed 1. 11 is the distributing-pipe arranged along and supported by the girder 8. The pipe 11 is plugged at its outer end 12 near the edge of the bed 1, and at its inner end it communicates with the pipe 5 by means of a vertical connecting-pipe 13, formed at its lower end with a suitable revoluble joint, such as a spigot, working in the socketed upper end of the pipe 5. A stuffing-box 14 allows the spigot end of the pipe 13 to revolve freely in the socket end of the pipe 5 during the travel of the girder 8 and pipe 11 over the filter-bed. The pipe 13 is continued up beyond its junction with the distributing-pipe 11 in the form of a vertical pipe 15 for the purpose of giving vent to confined air or other gases.

Referring to the detailed construction of the distributing-pipe 11, as shown in Figs. 3, 4, and 5, the said pipe is composed of a number of pipes or pipe lengths 16, connected together in line by means of flanged joints or any other suitable means, so as to provide a continuous bore 16ª throughout the connected pipe lengths. As shown, each pipe length constitutes a self-contained distributing-section of the distributing-pipe 11. Each said section is formed on its upper side with a longitudinal trough 17, having at the center of its length an adjustable regulator of the slide-valve type comprising a suitably-placed valve-seat 18, in which is an opening 19, that affords free passage for liquid from the bore 16ª into the trough 17, except when closed by the slide-valve 20, working on the valve-seat 18. The slide-valve 20 is formed with a central inlet-port 21 and with discharge-openings 22 22 at its opposite ends. The passage area through the opening 19 and valve-port 21 can be regulated as desired by simply adjusting the valve 20 in the required position, in which it is then securely retained by means of set-screws 23. 24 represents vertical ribs formed at intervals on the pipes 16 and also on the sides of the trough 17. They have for their object to prevent the liquid flowing down the sides of the pipe from traveling along the bottom of the pipe. By thus confining the liquid flowing down the sides of the pipe within the limits provided by said ribs great uniformity of distribution of liquid is effected. In operation the liquid supplied through the pipe 4 passes up through the pipes 5 and 13 into the several sections 16 of the distributing-pipe 11, whence the liquid wells up through the openings 19 into the troughs 17 and, overflowing the sides of the latter, flows down between the ribs 24 to the under side of the pipes 16, from which the liquid falls off in the form of a thin sheet which is distributed evenly over the filter-bed 1 by the travel of the distributing-pipe 11 over the entire extent of the bed.

Referring to Figs. 6, 7, and 8, which illustrate the stationary modification, 25 represents notches formed at intervals in the upper edges of the sides of the trough 17. These notches 25 serve to promote greater uniformity of overflow of liquid from the trough. 26 represents continuous projecting webs formed on the sides of the pipe 16. They have serrated edges 27, and their object is to cause the liquid flowing down the sides of the pipe to assume the form of thin sheets, which drip on reaching the serrated edges. The serrations in the edges 27 promote uniformity of drip of liquid from the webs 26. The vertical ribs 24 extend to the serrated edges 27.

Referring to Figs. 9 and 10, which illustrate an open-topped horizontal duct, 28 is the duct provided with a longitudinal trough 29, arranged parallel to it. 30 represents openings formed in the wall of the duct, whereby liquid is enabled to pass from the channel 28ª of the duct into the trough. 31 is an adjustable regulator of the clip type, consisting of a plate of metal bent so as to fit tightly over the wall of the duct in which the opening 30 is formed in such a manner as to be adapted to close said opening to a greater or less extent, according as the said plate is set lower or higher. 32 represents set-screws for securing the regulator-plate 31 in position after adjustment. 24 represents the vertical ribs already referred to, serving to confine the liquid flowing down the side of the trough.

What I claim, and desire to secure by Letters Patent, is—

1. In apparatus for distributing liquid over filter-beds, the combination of a horizontal distributing-duct, a longitudinal trough arranged parallel to it, and means whereby liquid is enabled to pass from the channel of said duct into the trough and flow therefrom onto the surface of the filter-beds, substantially as set forth.

2. In apparatus for distributing liquid over filter-beds, the combination of a horizontal distributing-pipe, a longitudinal trough arranged parallel to it, and means whereby liquid is enabled to pass from the bore of said pipe into the trough and flow therefrom onto the surface of the filter-beds, substantially as set forth.

3. In apparatus for distributing liquid over filter-beds, the combination of a horizontal distributing-duct, a longitudinal trough arranged parallel to it, and means whereby liquid is enabled to pass from the channel of said duct into the trough and flow over the sides of said trough, substantially as set forth.

4. In apparatus for distributing liquid over filter-beds, a horizontal distributing-pipe formed on its upper side with a longitudinal trough, and with openings affording communication between the base of said pipe and the interior of said trough whereby liquid is enabled to pass from the bore of said pipe through the said openings into the trough and flow over the sides of said trough and down the sides of said pipe, substantially as set forth.

5. In apparatus for distributing liquid over filter-beds, a horizontal distributing-pipe formed with openings in its upper part, and with a longitudinal web on each side below said openings, whereby liquid can pass from the bore of said pipe out through said openings and flow down the sides of said pipe and over said web on each side, onto the surface of the filter-bed, substantially as set forth.

6. In apparatus for distributing liquid over filter-beds, a horizontal distributing-pipe formed on its upper side with a longitudinal trough and with openings affording communication between the bore of said pipe and the interior of said trough, and with a longitudinal serrated web on each side, whereby liquid is enabled to pass from the bore of said pipe through the aforesaid openings into the trough and flow over the sides of said trough and down the sides of said pipe, and is caused by said webs to assume the form of two thin sheets of liquid, substantially as set forth.

7. In apparatus for distributing liquid over filter-beds, a horizontal distributing-duct provided with a longitudinal trough arranged parallel therewith, and with openings affording communication between the channel of said duct and the interior of said trough, and with vertical ribs formed on the side of said trough at intervals along its length, whereby liquid is enabled to pass from the channel of said duct through the aforesaid openings into the trough and flow over the side of said trough and is prevented by said ribs from flowing along the side of said trough, substantially as set forth.

8. In apparatus for distributing liquid over filter-beds, a horizontal distributing-pipe formed on its upper side with a longitudinal trough and with openings affording communication between the bore of said pipe and the interior of said trough, and with vertical ribs formed on the sides of said pipe at intervals along its length, whereby liquid is enabled to pass from the bore of said pipe through the aforesaid openings into the trough and flow over the sides of said trough and down the sides of said pipe, and is prevented by said ribs from flowing along said pipe, substantially as set forth.

9. In apparatus for distributing liquid over filter-beds, a horizontal distributing-pipe formed on its upper side with a longitudinal trough and with openings affording communication between the bore of said pipe and the interior of said trough, and with vertical ribs formed on the sides of said trough and said pipe at intervals along its length, whereby liquid is enabled to pass from the bore of said pipe through the aforesaid openings into the trough and flow over the sides of said trough and down the sides of said pipe, and is prevented by said ribs from flowing along said trough and said pipe, substantially as set forth.

10. In apparatus for distributing liquid over filter-beds, a horizontal distributing-pipe formed on its upper side with a longitudinal trough and with openings affording communication between the bore of said pipe and the interior of said trough and with a longitudinal serrated web on each side, and also with vertical ribs formed on the sides of said pipe at intervals along its length, substantially as set forth.

11. In apparatus for distributing liquid over filter-beds, the combination of a pipe formed with a longitudinal trough, and with openings affording communication between the bore of said pipe and the interior of said trough, said distributing-pipe being adapted to rotate horizontally on a vertical axis situated near the inlet end of the said pipe, and means for supplying liquid to the said pipe during its travel over the bed, whereby the liquid supplied to the said pipe is distributed evenly over said bed, substantially as set forth.

12. In apparatus for distributing liquid over filter-beds, the combination of a horizontal distributing-pipe formed on its upper side with a plurality of longitudinal troughs arranged in line with one another, with holes supplying each trough with liquid from the bore of the said pipe, and with vertical ribs formed on the sides of the said pipe at intervals of its length, said distributing-pipe being adapted to rotate horizontally on a vertical axis situated near its inlet end, and means for supplying the said pipe with liquid during the travel of said pipe over the filter-bed, whereby the liquid supplied to said pipe is caused to flow over the sides of the troughs and down the sides of the said pipe, and be discharged from the under-side portion of said pipe directly underlying the trough portion from which the said liquid has overflowed, substantially as set forth.

13. In apparatus for distributing liquid over large areas, the combination of a horizontal distributing-pipe comprising a plurality of sections each formed with a trough supplied through openings from the bore of the section, means for controlling the passage area of said openings, said distributing-pipe being closed at one end, and open at its other end, and adapted to rotate horizontally on a vertical axis passing approximately through said open end, and means for supplying liquid to said pipe through said open end during the travel of the said pipe, whereby each trough can be supplied with an amount of liquid which is proportionate to the area swept over
5 by the corresponding section during the travel of the distributing-pipe, substantially as set forth.

In witness whereof I have hereunto signed my name in the presence of two subscribing witnesses.

WILLIAM DUNDAS SCOTT-MONCRIEFF.

Witnesses:
GEORGE C. BACON,
ALFRED E. GRAY.